United States Patent
Hamasaki et al.

(10) Patent No.: US 12,025,305 B2
(45) Date of Patent: Jul. 2, 2024

(54) SOLUTE CONCENTRATION DECISION METHOD AND WATER QUALITY MANAGEMENT METHOD FOR STEAM TURBINE PLANT

(71) Applicant: MITSUBISHI HEAVY INDUSTRIES, LTD., Tokyo (JP)

(72) Inventors: Akihiro Hamasaki, Kanagawa (JP); Haruka Kido, Kanagawa (JP); Mitsuru Nakamoto, Kanagawa (JP); Senichi Tsubakizaki, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 416 days.

(21) Appl. No.: 17/631,149

(22) PCT Filed: Sep. 25, 2020

(86) PCT No.: PCT/JP2020/036232
§ 371 (c)(1),
(2) Date: Jan. 28, 2022

(87) PCT Pub. No.: WO2021/060456
PCT Pub. Date: Apr. 1, 2021

(65) Prior Publication Data
US 2022/0290858 A1   Sep. 15, 2022

(30) Foreign Application Priority Data

Sep. 25, 2019 (JP) .................................. 2019-174057

(51) Int. Cl.
*F22D 11/00* (2006.01)
*C02F 1/66* (2023.01)
(Continued)

(52) U.S. Cl.
CPC .............. *F22D 11/006* (2013.01); *C02F 1/66* (2013.01); *C02F 2103/34* (2013.01); *C02F 2303/08* (2013.01); *F22B 35/008* (2013.01)

(58) Field of Classification Search
CPC ...... F22D 11/006; C02F 1/66; C02F 2103/34; C02F 2303/08; F22B 35/008; F22B 37/56; F01D 25/00
(Continued)

(56) References Cited

U.S. PATENT DOCUMENTS

| | | | | |
|---|---|---|---|---|
| 4,485,629 | A * | 12/1984 | Le Goff | F28D 20/003 60/659 |
| 4,534,175 | A * | 8/1985 | Kogan | F25B 37/00 261/114.1 |
| 6,196,000 | B1 * | 3/2001 | Fassbender | F22B 1/22 60/649 |

FOREIGN PATENT DOCUMENTS

| | | |
|---|---|---|
| JP | 63-91407 | 4/1988 |
| JP | 2680454 | 11/1997 |

(Continued)

OTHER PUBLICATIONS

International Search Report issued Dec. 1, 2020 in International (PCT) Application No. PCT/JP2020/036232, 2 pages.

(Continued)

*Primary Examiner* — Hoang M Nguyen
(74) *Attorney, Agent, or Firm* — Wenderoth, Lind & Ponack, L.L.P.

(57) ABSTRACT

A solute concentration decision method for deciding a planned value $C_I$ of a concentration of a solute in a solution to be supplied to a first drum among one or more steam drums for temporarily containing steam generated in a boiler of a steam turbine plant includes a step of deciding the planned value $C_I$ of the concentration of the solute in the solution to be supplied to the first drum, on the basis of a (Continued)

target concentration of the solute in the solution in the first drum and a capacity coefficient of the solute in a drum unit including the first drum and an evaporator for generating steam contained in the first drum.

10 Claims, 6 Drawing Sheets

(51) Int. Cl.
*C02F 103/34* (2006.01)
*F22B 35/00* (2006.01)

(58) Field of Classification Search
USPC .................................................. 60/649, 673
See application file for complete search history.

(56) References Cited

FOREIGN PATENT DOCUMENTS

| | | |
|---|---|---|
| JP | 4233746 | 3/2009 |
| JP | 4814077 | 11/2011 |
| JP | 2016-194396 | 11/2016 |
| JP | 6191070 | 9/2017 |

OTHER PUBLICATIONS

Ammonia Distribution Between Steam and Water Phases of HRSG, MHPS, Sep. 27, 2019, PPChem Forum USA, 8 pages.

* cited by examiner

SOLUTE CONCENTRATION DECISION METHOD AND WATER QUALITY MANAGEMENT METHOD FOR STEAM TURBINE PLANT

TECHNICAL FIELD

The present disclosure relates to a solute concentration decision method and a water quality management method for a steam turbine plant.

BACKGROUND

In a steam turbine plant, chemical agents are sometimes added to feedwater to prevent corrosion of equipment that come in contact with the feedwater.

For example, Patent Document 1 describes the addition of a pH adjuster to feedwater to maintain the pH of feedwater in a steam drum of a steam turbine plant within an appropriate range where corrosion is unlikely to occur. In Patent Document 1, ammonia is used as the pH adjuster, and on the basis of a partition ratio of ammonia between the gas and liquid phases (gas-liquid partition coefficient) in the steam drum, the ammonia concentration in feedwater to be supplied to the steam drum is adjusted so that the ammonia concentration in the feedwater in the steam drum is within a predetermined range and the pH of feedwater in the steam drum is within an appropriate range.

CITATION LIST

Patent Literature

Patent Document 1: JP4233746B

SUMMARY

Problems to be Solved

It is known that there is a certain correlation between the gas-liquid partition coefficient and pressure, but as a result of intensive studies by the inventors, it was found that the gas-liquid partition coefficient based on actual measurements in a steam drum of a steam turbine plant may deviate significantly from the known value (literature value), especially in a low-pressure region (between 0.2 MPa and 1 Mpa, approximately).

Therefore, if feedwater (solution) with the agent (solute) concentration decided based on the gas-liquid partition coefficient (literature value) is supplied to the steam drum especially when the operating pressure is low, the agent concentration in the feedwater in the steam drum may not be properly adjusted, which may cause problems such as insufficient inhibition of corrosion of equipment such as the steam drum.

In view of the above, an object of at least one embodiment of the present invention is to provide a solute concentration decision method for a solution to be supplied to a steam drum and a water quality management method for a steam turbine plant whereby it is possible to appropriately adjust the solute concentration of the solution in the steam drum.

Solution to the Problems

A solute concentration decision method according to at least one embodiment of the present invention is a method for deciding a planned value $C_I$ of a concentration of a solute in a solution to be supplied to a first drum among one or more steam drums for temporarily containing steam generated in a boiler of a steam turbine plant, including a step of deciding the planned value $C_I$ of the concentration of the solute in the solution to be supplied to the first drum, on the basis of a target concentration of the solute in the solution in the first drum and a capacity coefficient of the solute in a drum unit including the first drum and an evaporator for generating steam contained in the first drum.

Further, a solute concentration decision method according to at least one embodiment of the present invention is a method for deciding a planned value $C_I$ of a concentration of a solute in a solution to be supplied to a first drum among one or more steam drums for temporarily containing steam generated in a boiler of a steam turbine plant, including: a step of setting a target concentration of the solute in the solution of the first drum; a step of obtaining a capacity coefficient of a drum unit including the first drum and an evaporator for generating steam contained in the first drum, on the basis of a specification of the steam turbine plant; and a step of deciding the planned value $C_I$ of the concentration of the solute in the solution to be supplied to the first drum, on the basis of the target concentration and the capacity coefficient.

Further, a water quality management method for a steam turbine plant according to at least one embodiment of the present invention includes a step of adjusting a concentration of a solute in a solution to be supplied to the first drum, on the basis of the planned value $C_I$ of the concentration of the solute decided in accordance with the above-described solute concentration decision method.

Advantageous Effects

At least one embodiment of the present invention provides a solute concentration decision method for a solution to be supplied to a steam drum and a water quality management method for a steam turbine plant whereby it is possible to appropriately adjust the solute concentration of the solution in the steam drum.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

(Configuration of Steam Turbine Plant)

Figure 1:
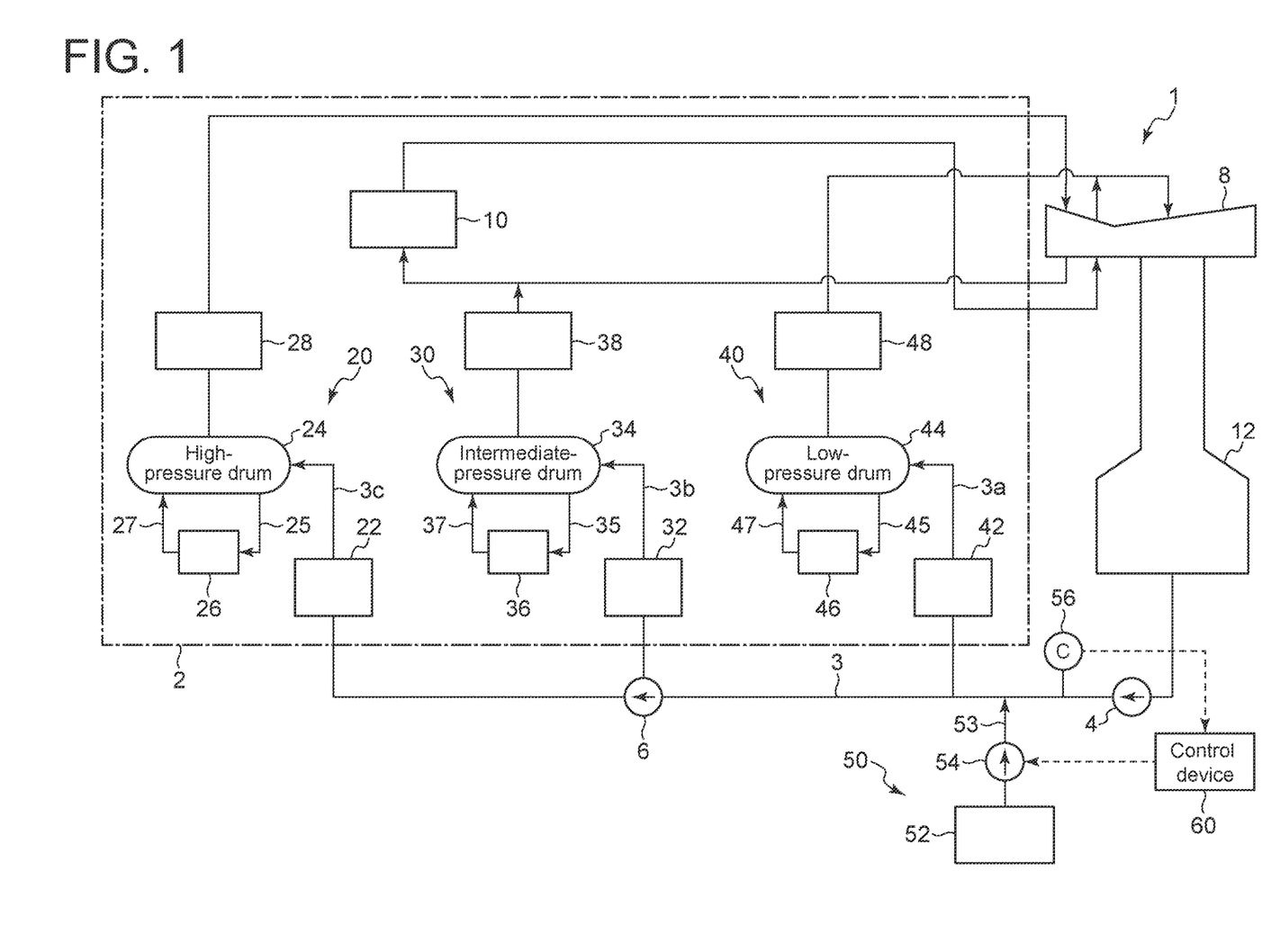
FIG. 1 is a schematic configuration diagram of a steam turbine plant to which a solute concentration decision method and a water quality management method according to an embodiment are applicable.
Figure 2:
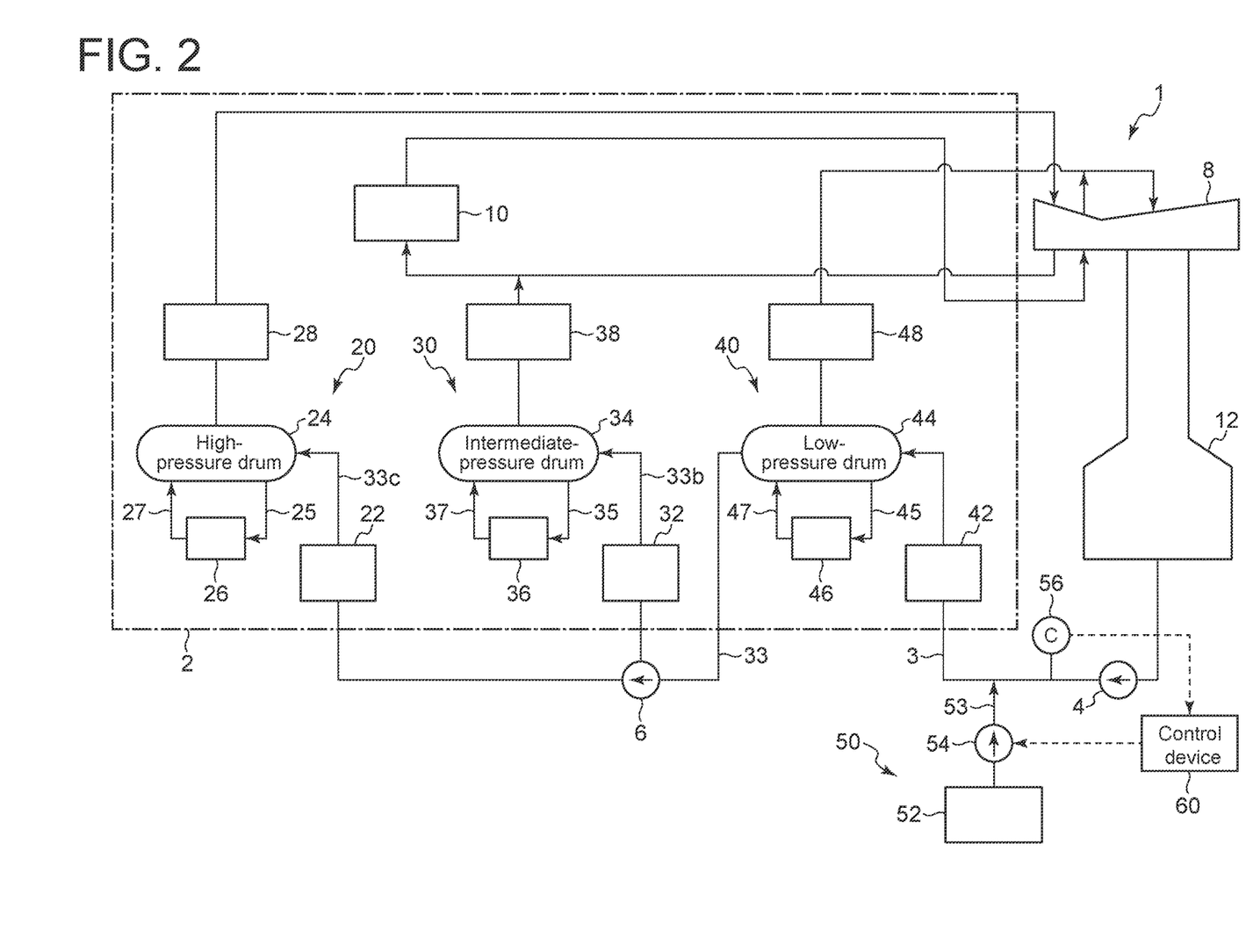
FIG. 2 is a schematic configuration diagram of a steam turbine plant to which a solute concentration decision method and a water quality management method according to an embodiment are applicable.

FIGS. 1 and 2 are each a schematic configuration diagram of a steam turbine plant to which a solute concentration decision method and a water quality management method according to an embodiment are applicable. As shown in FIGS. 1 and 2, the steam turbine plant 1 includes a heat recovery steam generator 2 configured to be supplied with flue gas from a gas turbine (not shown), and a steam turbine 8 configured to be driven by steam from the heat recovery steam generator 2. The steam turbine 8 may be configured to drive a generator.

The heat recovery steam generator 2 includes steam drums (24, 34, 44) including a high-pressure drum 24, an intermediate-pressure drum 34, and a low-pressure drum 44, economizers (high-pressure economizer 22, intermediate-pressure economizer 32, and low-pressure economizer 42), evaporators (high-pressure evaporator 26, intermediate-pressure evaporator 36, and low-pressure evaporator 46), and superheaters (high-pressure superheater 28, intermediate-pressure superheater 38, and low-pressure superheater 48), which are provided corresponding to the steam drums (24, 34, 44), and a reheater 10. The internal pressure of the steam drums during operation of the steam turbine plant 1 is highest in the high-pressure drum 24, next highest in the intermediate-pressure drum 34, and lowest in the low-pressure drum 44.

The economizer (22, 32, 42) is configured to heat feedwater from a feedwater line 3 through heat exchange with the flue gas. The feedwater heated by the economizer (22, 32, 42) is introduced to the steam drum (24, 34, 44) corresponding to each economizer.

Each steam drum (24, 34, 44) is connected to the corresponding evaporator (26, 36, 46) via a downcomer tube (25, 35, 45) and an evaporator tube (27, 37, 47). The feedwater in the steam drum (24, 34, 44) is introduced to the evaporator (26, 36, 46) via the downcomer tube (25, 35, 45).

The evaporator (26, 36, 46) is configured to generate steam by evaporating the feedwater through heat exchange with the flue gas. The steam generated by the evaporator (26, 36, 46) flows into the steam drum (24, 34, 44) via the evaporator tube (27, 37, 47) together with the feedwater (i.e., in the form of two-phase flow). In the steam drum (24, 34, 44), the steam and the feedwater are separated by a gas-liquid separator (not shown), and the separated steam is temporarily contained in the steam drum (24, 34, 44) as saturated steam. The saturated steam in the steam drum (24, 34, 44) is introduced to the superheater (28, 38, 48) corresponding to each steam drum (24, 34, 44).

The superheater (28, 38, 48) is configured to heat the steam from the steam drum (24, 34, 44) through heat exchange with the flue gas. The steam heated by the superheater (28, 38, 48) and the reheater 10 is introduced to the steam turbine 8 and rotationally drive the steam turbine 8.

The steam from each steam drum (24, 34, 44) is heated by the corresponding superheater (28, 38, 48), and then introduced into a high-pressure turbine part, an intermediate-pressure turbine part, and a low-pressure turbine part of the steam turbine 8, respectively. The steam that has passed through the high-pressure turbine part is combined with the steam from the intermediate-pressure superheater 38 and introduced to the reheater 10. The steam is then reheated by the reheater 10 and introduced to the intermediate-pressure turbine part of the steam turbine 8. The steam that has passed through the intermediate-pressure turbine part is combined with the steam from the low-pressure superheater 48 and introduced to the low-pressure turbine part of the steam turbine 8.

The steam that has passed through the low-pressure turbine part of the steam turbine 8 is introduced to the condenser 12 connected to the low-pressure turbine part and is condensed by the condenser 12. The condensed water is supplied to each steam drum (24, 34, 44) via the feedwater line 3 and the feedwater pump 4 as feedwater.

In the exemplary embodiment shown in FIG. 1, the steam turbine plant 1 is a steam turbine plant of parallel water supply type in which feedwater from the feedwater line 3 and the feedwater pump 4 is supplied to the high-pressure drum 24, the intermediate-pressure drum 34, and the low-pressure drum 44 in parallel.

Specifically, the feedwater line 3 includes a low-pressure branch line $3a$ connected to the low-pressure drum 44, an intermediate-pressure branch line $3b$ connected to the intermediate-pressure drum 34, and a high-pressure branch line $3c$ connected to the high-pressure drum 24. Through the respective branch lines ($3a$, $3b$, $3c$), the feedwater is supplied to the low-pressure drum 44, the intermediate-pressure drum 34, and the high-pressure drum 24. In the feedwater line 3, a high and intermediate pressure feedwater pump 6 is disposed upstream of the intermediate-pressure drum 34 and the high-pressure drum 24. The feedwater boosted by the high and intermediate pressure feedwater pump 6 is supplied to the intermediate-pressure drum 34 and the high-pressure drum 24.

In the exemplary embodiment shown in FIG. 2, the steam turbine plant 1 is a steam turbine plant of low-pressure water supply type in which feedwater from the feedwater line 3 and the feedwater pump 4 is supplied to the low-pressure drum 44, and part of the feedwater in the low-pressure drum 44 is discharged from the low-pressure drum 44 and supplied to the intermediate-pressure drum 34 and the high-pressure drum 24.

Specifically, a high and intermediate pressure feedwater line 33 is connected to the low-pressure drum 44 to extract part of the feedwater from the liquid phase part of the low-pressure drum 44. The high and intermediate pressure feedwater line 33 includes an intermediate-pressure branch line $33b$ connected to the intermediate-pressure drum 34 and a high-pressure branch line $33c$ connected to the high-pressure drum 24. The feedwater extracted from the low-pressure drum 44 via the high and intermediate pressure feedwater line 33 is boosted by a high and intermediate pressure feedwater pump 6 disposed in the high and intermediate pressure feedwater line 33 and is supplied to the intermediate-pressure drum 34 and the high-pressure drum 24 via the respective branch lines ($33b$, $33c$).

The steam turbine plant 1 shown in FIGS. 1 and 2 includes an agent supply part 50 for supplying an agent to the feedwater in the feedwater line 3. The agent supply part 50 includes an agent tank 52, an agent line 53 disposed between the agent tank 52 and the feedwater line 3, and an agent pump 54 disposed in the agent line 53.

The agent line 53 is connected to the feedwater line 3 at a position downstream of the condenser 12 and upstream of the low-pressure economizer 42 (i.e., upstream of the branch point of the low-pressure branch line $3a$). Accordingly, the feedwater mixed with an agent from the agent tank 52 and the agent line 53 is supplied to the low-pressure drum 44, the intermediate-pressure drum 34, and the high-pressure drum 24 via the feedwater line 3.

The agent supplied from the agent supply part 50 to the feedwater may be an agent capable of inhibiting corrosion of equipment (e.g., economizer (22, 32, 42), steam drum (24, 34, 44), etc.) that comes into contact with the feedwater. The agent may be a pH adjuster capable of adjusting pH of the feedwater to inhibit corrosion that is likely to occur when pH of the feedwater is within a predetermined range. Examples of such a pH adjuster include ammonia. Alternatively, the agent may be a film forming agent capable of inhibiting corrosion by forming a film on the equipment. Examples of such a film forming agent include amine.

The steam turbine plant 1 shown in FIGS. 1 and 2 includes a control device (control part) 60 for adjusting the amount of the agent supplied to the feedwater in the feedwater line 3 by the agent supply part 50. The control device 60 is configured to adjust the supply amount of the agent so that the agent concentration in the feedwater supplied to any (typically, low-pressure drum 44) of the steam drums (24, 34, 44) has a planned value $C_I$ of the agent (solute) concentration decided by a later-described method.

The control device 60 may be configured to adjust the supply amount of the agent by controlling the output power of the agent pump 54 on the basis of a measurement value of the agent concentration in the feedwater by a concentration sensor 56. The concentration sensor 56 is disposed in the feedwater line 3 at a position downstream of the condenser 12 and upstream of the connection position of the agent line 53. The concentration sensor 56 may measure the agent concentration in the feedwater and transmit the measured agent concentration to the control device. Alternatively, the concentration sensor 56 may measure the electrical conductivity of the feedwater and transmit the agent concentration in the feedwater converted from the electrical conductivity. Alternatively, the electrical conductivity of the feedwater measured by the concentration sensor 56 may be converted into the solute concentration in the control device 60.

The concentration sensor 56 may be disposed at a position downstream of the connection position of the agent line 53.

The control device 60 may be configured to adjust the injection amount of the agent, for example by PID control, so that a deviation between the value of electrical conductivity or the like measured by the concentration sensor 56 and the planned value approaches zero.

The steam turbine plant to which the solute concentration decision method and water quality management method according to the present invention are applicable is not limited to the above-described steam turbine plant 1 equipped with the heat recovery steam generator 2, but may be, for example, a steam turbine plant configured to drive a steam turbine by steam generated by a boiler which combusts fuel such as coal, petroleum, liquefied natural gas, or heavy oil.

(Solute Concentration Decision Method)

Next, the method for deciding a planned value $C_I$ of the concentration of the agent (solute) in the feedwater (solution) to be supplied to a first drum, which is any one of the steam drums (24, 34, 44), will be described.

In some embodiments, the planned value $C_I$ of the concentration of the agent (solute) in the feedwater (solution) to be supplied to the first drum is decided on the basis of a target concentration $C_L$ of the agent (solute) in the feedwater (solution) in the first drum and a capacity coefficient $K_L A$ of the agent (solute) in a drum unit including the first drum (hereinafter, also simply referred to as capacity coefficient $K_L A$). The feedwater (solution) in the first drum is feedwater (solution) retained in the first drum.

The target concentration $C_L$ of the agent (solute) in the feedwater (solution) in the first drum is determined according to the purpose of use of the agent (solute). For example, when the pH adjuster is used as the agent for the purpose of inhibiting corrosion of equipment that tends to occur when pH of the feedwater is less than a specified value, the target concentration $C_L$ of the agent is set so that pH of the feedwater in the first drum is within a target range (e.g., equal to or higher than the specified value).

The capacity coefficient $K_L A$ is a coefficient related to the mass transfer rate of the agent (solute) from the liquid phase (i.e., feedwater (solution)) to the gas phase (i.e., steam) in the drum unit, and can be calculated by the procedure described below.

The drum unit is a unit including a device in which mass transfer of the agent (solute) from the liquid phase (feedwater (solution)) to the gas phase (steam) occurs, i.e., a device in which gas-liquid contact occurs, and includes a first drum (steam drum 24, 34 or 44), an evaporator (evaporator 26, 36 or 46) connected to the first drum, and an evaporator tube (evaporator tube 27, 37 or 47) disposed between the first drum and the evaporator. In other words, the drum unit in the steam turbine plant 1 is a high-pressure drum unit 20 including the high-pressure drum 24, the high-pressure evaporator 26, and the evaporator tube 27, an intermediate-pressure drum unit 30 including the intermediate-pressure drum 34, the intermediate-pressure evaporator 36, and the evaporator tube 37, or a low-pressure drum unit 40 including the low-pressure drum 44, the low-pressure evaporator 46, and the evaporator tube 47.

In the following description, a method for deciding the planned value $C_I$ of the concentration of the agent (solute) in the feedwater (solution) to be supplied to the low-pressure drum 44 as the first drum will be described, but the same shall apply to the case where the first drum is the intermediate-pressure drum 34 or the high-pressure drum 24.

(Calculation Procedure of Capacity Coefficient $K_L A$)

The capacity coefficient $K_L A$ of the solute in the low-pressure drum unit 40 including the low-pressure drum 44 can be calculated according to the following procedure. Here, on the basis of the two-film theory, the capacity coefficient $K_L A$ is calculated on the assumption that the inside of the low-pressure drum 44 is in a steady state.

Figure 3:
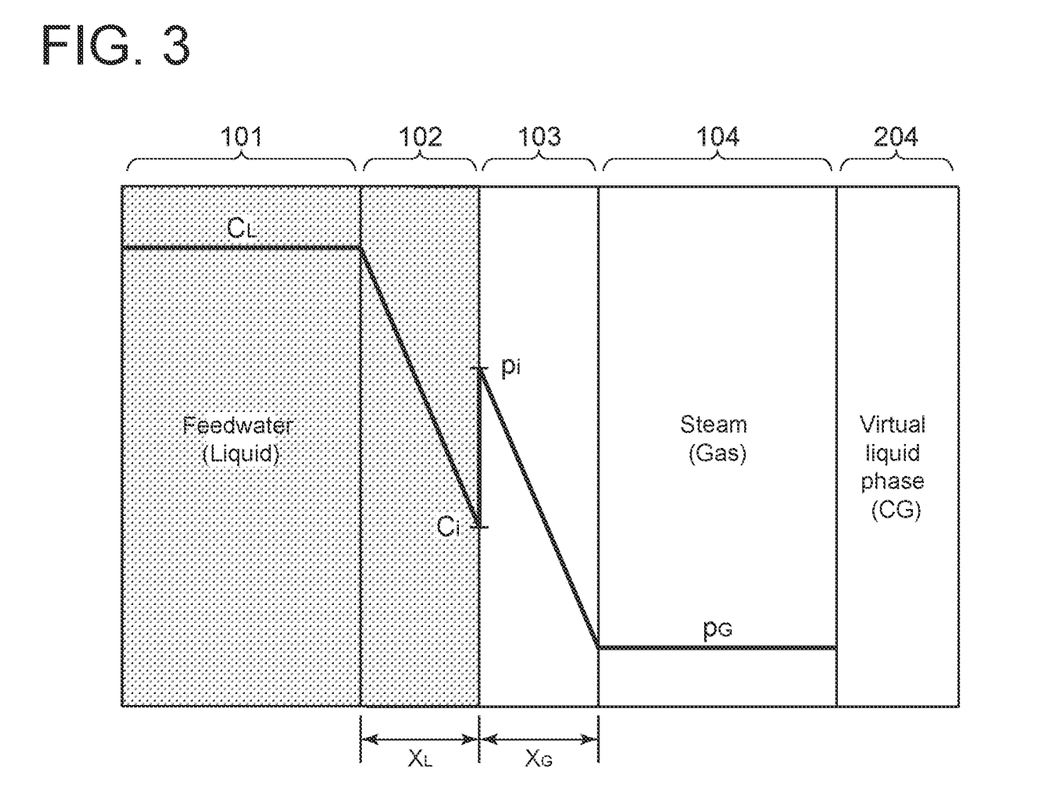
FIG. 3 is a schematic diagram based on the two-film model in the vicinity of a gas-liquid interface between feedwater and steam in a low-pressure drum unit.

FIG. 3 is a schematic diagram based on the two-film model in the vicinity of a gas-liquid interface between feedwater and steam in the low-pressure drum unit 40. As shown in FIG. 3, according to the two-film theory, there are a liquid boundary film 102 (boundary film thickness $x_L$) and a gas boundary film 103 (boundary film thickness $x_G$) on both sides of the interface (gas-liquid interface) between feedwater (liquid) and steam (gas). The two-film theory assumes that the solute concentration C in the feedwater (liquid) and the solute partial pressure p in the steam (gas) change linearly, and the resistance to mass transfer is concentrated in the two boundary films (liquid boundary film 102 and gas boundary film 103). It also assumes that gas-liquid equilibrium is established at the gas-liquid interface. The solute concentration in the liquid body (bulk liquid phase; feedwater) 101 is $C_L$ [mg/L], the solute concentration in the liquid boundary film 102 at the gas-liquid interface is $C_i$ [mg/L], the solute partial pressure in the gas body (bulk gas phase; steam) 104 is $p_G$ [Pa], and the solute partial pressure in the gas boundary film 103 at the gas-liquid interface is $p_i$ [Pa].

In the following, we will focus on the mass transfer of the solute from the liquid phase (liquid, feedwater) to the gas phase (steam).

The solute moves from the liquid body 101 to the gas-liquid interface using the concentration difference ($C_L-C_i$) in the liquid boundary film 102 as a driving force, and moves from the gas-liquid interface to the gas body 104 using the partial pressure difference ($p_i-p_G$) in the gas boundary film 103 as a driving force. At this time, the mass transfer rate $N_1$ [g/h] in the liquid boundary film 102 and the mass transfer rate $N_2$ [g/h] in the gas boundary film 103 can be expressed by the following expressions (a) and (b).

$$N_1 = k_L \times A \times (C_L - C_i) \quad (a)$$

$$N_2 = k_G \times A \times (p_i - p_G) \quad (b)$$

In the expressions, A [m²] is the gas-liquid contact area (the area of the gas-liquid interface), $k_L$ [g·m/h] is the liquid-side mass transfer coefficient, and $k_G$ [g/(m²·Pa·h)] is the gas-side mass transfer coefficient. In the steady state, the rate at which the solute passes through the liquid boundary film 102 is equal to the rate at which the solute passes through the gas boundary film 103 (i.e., $N_1=N_2(=N$ [g/h]) is established), so the following expression (c) is established from the expressions (a) and (b).

$$N = k_L \times A \times (C_L - C_i) = k_G \times A \times (p_i - p_G) \quad (c)$$

Using Henry's law (i.e., the law stating that in a solution in gas-liquid equilibrium, the partial pressure of a solute in the gas phase is proportional to the concentration of a solute in the liquid phase), $C_i$ and $p_i$ are eliminated from the expression (c). Since it is assumed that gas-liquid equilibrium is established at the gas-liquid interface, the following expression (d) is established by Henry's law. In the following expression, m is Henry constant.

$$p_i = mC_i \quad (d)$$

Assuming that there is a virtual liquid phase 204 in gas-liquid equilibrium with the gas body 104 having the solute partial pressure p, the following expression (e) is established by Henry's law, where $C_G$ [mg/L] is the solute concentration in the virtual liquid phase.

$$p_G = mC_G \quad (e)$$

By modifying the expression (c), we obtain the following expressions (f) and (g).

$$(C_L - C_i) = N/(k_L \times A) \quad (f)$$

$$(p_i - p_G) = N/(k_G \times A) \quad (g)$$

By eliminating pi from the expressions (d) and (g), we obtain the following expression (h).

$$mC_i - p_G = N/(k_G \times A) \quad (h)$$

From the expressions (e) and (h), we obtain the following expression (i).

$$(C_i - C_G) = N/(m \times k_G \times A) \quad (i)$$

By eliminating $C_i$ from the expressions (d) and (g) for simplification, we obtain the following expression (j).

$$N = A \times (1/k_L + 1/mk_G) \times (C_L - C_G) \quad (j)$$

Using the liquid-side overall mass transfer coefficient $K_L = (1/k_L + 1/mk_G)$, the following expression (k) is derived from the expression (j).

$$N = K_L A \times (C_L - C_i) \quad (k)$$

The product $K_L A$ [m³/h] of the overall mass transfer coefficient $K_L$ [m/h] and the gas-liquid contact area A [m²] is called the capacity coefficient. Although it is difficult to individually measure the overall mass transfer coefficient $K_L$ and the gas-liquid contact area A, the capacity coefficient $K_L A$ can be obtained by measurement.

Specifically, by modifying and simplifying the expression (k) using the expression (e), we obtain the following expression (l).

$$K_L A = N/(C_L - p_G/m) \quad (l)$$

In the expression (l), the solute concentration $C_L$ of the liquid body 101 can be measured because it is the concentration of the agent (solute) in the feedwater (solution) in the low-pressure drum 44. Further, the solute partial pressure $p_G$ in the gas body 104 can be calculated from the solute concentration in the gas phase and the pressure (total pressure) in the low-pressure drum 44. Therefore, if the mass transfer rate N and the Henry constant m are known, the capacity coefficient $K_L A$ can be calculated from the expression (l).

The Henry constant m can be obtained as follows.

When the solute concentration in the gas phase at the gas-liquid interface between the gas body 104 and the virtual liquid phase 204 is $C_S$ [mg/L], the total pressure of the gas phase (i.e., the pressure in the low-pressure drum 44) is P, the molecular weight of the solute is $M_A$, and the molecular weight of water is $M_{H2O}$, the solute partial pressure p at the gas-liquid interface is the product of the total pressure P and the mole fraction of the solute in the gas phase at the gas-liquid interface, which can be expressed by the following expression (m).

$$p = P \times (C_S/M_A)/\{(10^6/M_{H2O}) + (C_S/M_A)\} \quad (m)$$

Since $(10^6/M_{H2O})$ is sufficiently larger than $(C_S/M_A)$, we obtain the following approximate expression (n) from the expression (m).

$$p \approx P \times (M_{H2O} \times C_S \times 10^{-6})/M_A \quad (n)$$

Further, according to Henry's law, when the solute concentration in the virtual liquid phase at the gas-liquid interface between the gas body 104 and the virtual liquid phase 204 is $C_G$ [mg/L], the following expression (o) is established.

$$p = mC_G \quad (o)$$

From the expressions (n) and (o), the Henry constant m can be expressed by the following expression (p).

$$m \approx P \times \{M_{H2O} \times (C_S/C_G) \times 10^{-6}\}/M_A \quad (p)$$

Since the gas phase 104 and the virtual liquid phase 204 are in equilibrium, the gas-liquid partition coefficient κ of the solute ($\kappa = C_S/C_G$) is established. By modifying the expression (p) using this coefficient, we obtain the following expression (q).

$$m \approx P \times \{M_{H2O} \times \kappa \times 10^{-6}\}/M_A \quad (q)$$

Figure 4:
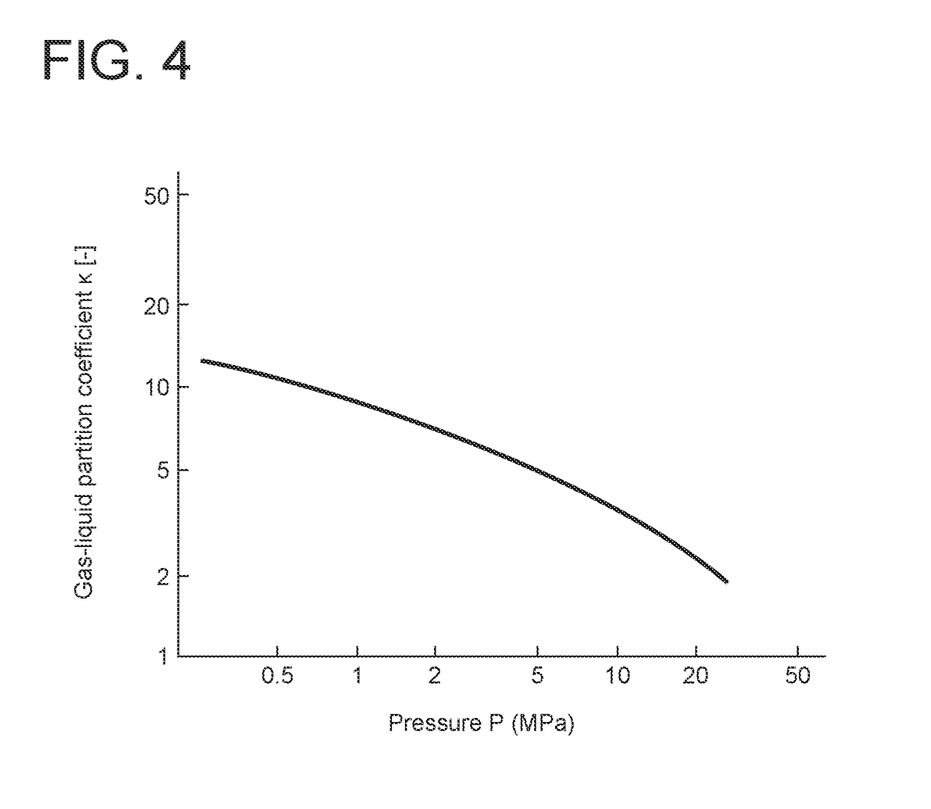
FIG. 4 is a graph showing a correlation between the gas-liquid partition coefficient and pressure of ammonia (solute).

FIG. 4 is a graph showing a correlation between the gas-liquid partition coefficient κ and pressure P (total pressure) of ammonia which is an example of the solute. As shown in FIG. 4, the gas-liquid partition coefficient κ changes depending on the pressure. Generally, the gas-liquid partition coefficient κ increases as the pressure P decreases. The correlation between the gas-liquid partition coefficient κ and the pressure P can be obtained through experiments. Several reports have already been made on the value of the gas-liquid partition coefficient κ of ammonia. For example, it is described in JIS B 8223: 2015 of the Japanese Industrial Standards, VGB-Standard, Feedwater, Boiler Water and Steam Quality for Power Plants/Industrial Plants, VGB-S-010-T-00; 2011-12., EN, Third edition 2011 (hereinafter referred to as VGB-Standard). Therefore, for ammonia, the Henry constant can be calculated from the expression (q) using the known gas-liquid partition coefficient κ (literature value).

When the solute is ammonia, the relationship between the gas-liquid partition coefficient κ and the pressure P [Pa] (see FIG. 4) can be expressed by the following expression (r), for example, by taking an average value of JIS B 8223: 2015 and VGB-Standard described above.

$$\kappa = -1.98 \times ln(10^{-3} \times P) + 7.62 \quad (r)$$

When the internal pressure of the low-pressure drum 44 is 0.5 MPa, κ is 9 from the expression (r). Therefore, κ=9 can be adopted as the gas-liquid partition coefficient in the low-pressure drum unit 40 when the solute is ammonia.

Further, since the water molecular weight $M_{H2O}$=18, the ammonia molecular weight $M_{NH3}$=17, and the gas-liquid partition coefficient κ=9, by substituting these values into the expression (q), we obtain the Henry constant m=4.76.

The mass transfer rate N can be obtained as follows.

Considering the mass balance in the low-pressure drum 44 (first drum) in the steady state, the mass transfer rate N [g/h] of the solute from the liquid phase to the gas phase can be expressed by the following expression (s) or (t).

$$N = C_S \times v_S \quad (s)$$

$$N = (C_I \times v_I - C_L \times V_O) \quad (t)$$

In the expressions (s) and (t), the solute concentration in the gas phase in the low-pressure drum 44 (i.e., the solute concentration in condensed water of the gas (steam) flowing out of the low-pressure drum 44) is $C_S$ [mg/L], the flow rate of the condensed water of the gas (steam) flowing out of the low-pressure drum 44 is $v_S$ [m³/h], the solute concentration in the solution (feedwater) to be supplied to the low-pressure drum 44 is $C_I$ [mg/L], the flow rate of the solution (feedwater) to be supplied to the low-pressure drum 44 is $v_I$ [m³/h], the solute concentration in the solution (feedwater) in the low-pressure drum 44 is $C_L$ [mg/L], and the flow rate of the solution (feedwater) flowing out of the low-pressure drum 44 is $v_O$ [m³/h].

Since $C_S$, $v_S$, $C_I$, $v_I$, $C_L$, and $v_O$ in the expressions are measurable, the mass transfer rate N can be calculated from these measurement values.

The solution (feedwater) to be supplied to the low-pressure drum 44 is the solution supplied to the low-pressure drum 44 via the feedwater line 3.

The gas flowing out of the low-pressure drum 44 is the gas (steam) flowing from the low-pressure drum 44 to the low-pressure superheater 48.

The flow rate $v_O$ [m³/h] of the solution (feedwater) flowing out of the low-pressure drum 44 is, for example, the flow rate of the solution (feedwater) discharged from the low-pressure drum 44 through the high and intermediate pressure feedwater line 33 and supplied to the intermediate-pressure drum 34 and the high-pressure drum 24 in the steam turbine plant 1 shown in FIG. 2.

In this way, the mass transfer rate N and the Henry constant m can be obtained, and the capacity coefficient $K_L A$ can be calculated from the expression (l) using the mass transfer rate N and the Henry constant m thus obtained.

(Example of Calculation Result of Capacity Coefficient)

Figure 5:
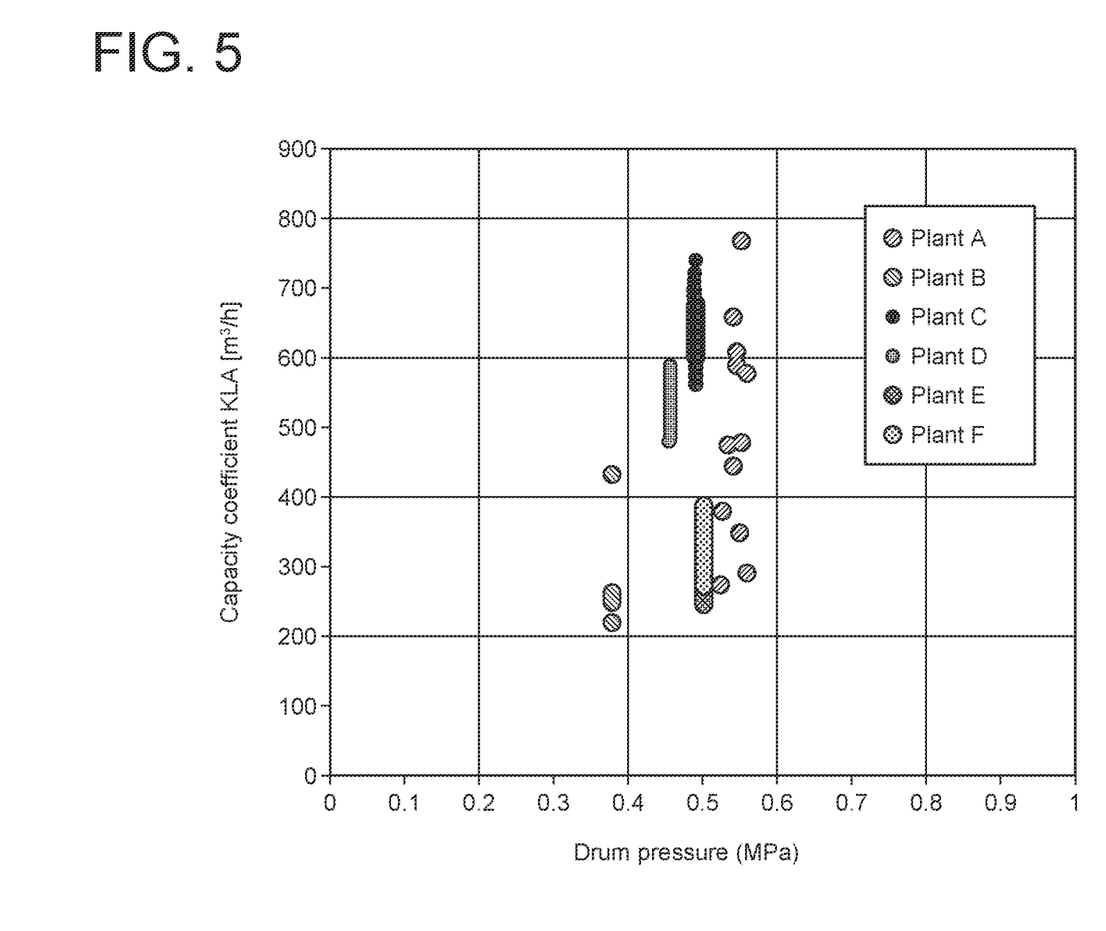
FIG. 5 is a graph showing an example of a calculation result of the capacity coefficient $K_L A$ based on measurement values in a plurality of steam turbine plants.

FIG. 5 is a graph showing an example of a calculation result of the capacity coefficient $K_L A$ based on measurement values in actual steam turbine plants. The plants A to F are steam turbine plants including the heat recovery steam generator 2 having the high-pressure drum 24, the intermediate-pressure drum 34, and the low-pressure drum. The plots in the figure represent the capacity coefficient $K_L A$ of ammonia (solute) calculated on the basis of the internal pressure of the low-pressure drum 44 for the low-pressure drum unit 40 in each plant. The unit of the capacity coefficient $K_L A$ shown in FIG. 5 is [m³/h].

As can be seen from FIG. 5, in the case of the low-pressure drum unit of the heat recovery steam generator, the capacity coefficient $K_L A$ [m³/h] of ammonia is in a range of about 200 to 800.

Thus, although the capacity coefficient $K_L A$ obtained for the multiple plants vary somewhat, they are all within a certain range, and the planned value $C_I$ of the concentration of the solution (feedwater) calculated in the procedure described below does not differ significantly even if the slightly varying capacity coefficient KLA is used. Therefore, the capacity coefficient $K_L A$ calculated on the basis of the measurement result at one plant can be used to calculate the planned value $C_I$ of the concentration of the solution (feedwater) at another plant as appropriate.

The reason for the slight variation in the capacity coefficient $K_L A$ calculated at the individual plants may be due to errors in measuring tools (pressure gauges, flow meters, etc.), the installation positions of the measuring tools, or the time difference between sample acquisition and sample analysis (sample transport time, etc.), which may vary with the individual plants.

(Calculation Procedure of Planned Value of Solute Concentration)

The procedure for deciding the planned value $C_I$ of the concentration of the agent (solute) in the feedwater (solution) to be supplied to the low-pressure drum 44 (first drum) using the capacity coefficient $K_L A$ will be described.

By eliminating the mass transfer rate N from the expressions (k) and (t), we obtain the following expression (u).

$$C_I = \{K_L A \times (C_L - C_G) + C_L \times v_O\}/v_I \quad (u)$$

From the expressions (s) and (t), the following expression (v) is established.

$$C_S \times v_S = (C_I \times v_I - C_L \times v_O) \quad (v)$$

Further, the following expression (w) is established in the low-pressure drum 44.

$$v_S = V_I - v_O \quad (w)$$

Accordingly, from the expressions (v) and (w), we obtain the following expression (x).

$$C_S = (C_I \times v_I - C_L \times v_O)/(v_I - v_O) \quad (x)$$

The solute partial pressure p in the gas phase is the product of the total pressure P and the mole fraction of the solute in the gas phase, and can be expressed as follows.

$$p \approx P \times (C_S/M_A)/(10^6 M_{H2O}) \quad (y)$$

Accordingly, from the expressions (e), (q), and (y), the following expression (z) is established.

$$C_G = C_S/\kappa \quad (z)$$

By substituting the expressions (x) and (z) into the expression (u), we obtain the following expression (A).

$$C_I = \frac{K_L A \cdot \kappa (v_I - v_O) + K_L A \cdot v_O + \frac{\kappa(V_I - v_O) \cdot v_O}{\kappa v_I (v_I - v_O) + K_L A \cdot v_I}}{} C_L \quad (A)$$

In the expression (A), the capacity coefficient $K_L A$ and the gas-liquid partition coefficient κ can be obtained by the procedure already described. Therefore, according to the expression (A), the planned value $C_I$ of the concentration in the solution (feedwater) to be supplied to the low-pressure drum 44 can be decided using the target concentration $C_L$ of the solution (feedwater) in the low-pressure drum 44, the planned value of the flow rate $v_I$ of the solution (feedwater) supplied to the low-pressure drum 44, and the planned value of the flow rate $v_O$ of the solution (feedwater) discharged from the low-pressure drum and supplied to the higher-pressure steam drum (intermediate-pressure drum 34 and/or high-pressure drum 24).

In addition, the following expression ($\alpha$) is obtained from the expressions (k), (s) and (z).

$$\frac{C_S}{C_L} = \left(\frac{1}{1+\frac{\kappa v_S}{K_L A}}\right)\kappa \quad (\alpha)$$

$C_S/C_L$ is the ratio of the solute concentration $C_S$ in the gas phase during mass transfer to the solute concentration $C_L$ in the liquid phase during mass transfer. This value is referred to as the actual gas-liquid partition coefficient during mass transfer in the low-pressure drum 44 (hereafter referred to as the actual gas-liquid partition coefficient), expressed as $\kappa_R$ and defined by the following expression ($\beta$).

$$\kappa_R = C_S/C_L \quad (\beta)$$

By combining the expressions ($\alpha$) and ($\beta$), the actual gas-liquid partition coefficient $\kappa_R$ can be expressed as the following expression (C).

$$\kappa_R = \frac{C_S}{C_L} = \left(\frac{1}{1+\frac{\kappa v_S}{K_L A}}\right)\kappa \quad (C)$$

That is, the actual gas-liquid partition coefficient $\kappa_R$ indicates the actual gas-liquid partition ratio when the solute (e.g., ammonia) moves from feedwater to steam, as in the relationship between feedwater and steam in the drum of the steam turbine plant.

The expressions ($\alpha$) and ($\beta$) indicate from their structure that the actual gas-liquid partition coefficient $\kappa_R$ is smaller than the gas-liquid partition coefficient $\kappa$, which indicates the gas-liquid partition ratio at equilibrium.

The expression (A) can also be obtained from the expressions (s), ($\alpha$), (v), and (w).

The method of deciding the planned value $C_I$ of the feedwater concentration using the expression (A) can be applied to the steam turbine plant of parallel water supply type as shown in FIG. 1 and the steam turbine plant of low-pressure water supply type as shown in FIG. 2, for example. In the case of the steam turbine plant of parallel water supply type as shown in FIG. 1, the flow rate $v_O$ of the solution (feedwater) discharged from the low-pressure drum 44 and flowing to the higher-pressure steam drum (intermediate-pressure drum 34 and/or high-pressure drum 24) is zero.

Further, by substituting $v_O = 0$ into the expression (A), we obtain the following expression (B).

$$C_I = \frac{\kappa \cdot K_L A}{\kappa v_I + K_L A} C_L \quad (B)$$

In the expression (B), the capacity coefficient $K_L A$ and the gas-liquid partition coefficient $\kappa$ can be obtained by the procedure already described. Therefore, according to the expression (B), the planned value $C_I$ of the concentration of the solute in the solution (feedwater) to be supplied to the first drum can be decided using the target concentration $C_L$ of the solution (feedwater) in the low-pressure drum 44 and the planned value of the flow rate $v_I$ of the solution (feedwater) supplied to the low-pressure drum 44.

The method of deciding the planned value $C_I$ of the solute concentration using the expression (B) can be applied to the steam turbine plant of parallel water supply type as shown in FIG. 1, for example.

The procedure for deciding the planned value $C_I$ of the feedwater concentration for the steam turbine plant 1 of parallel water supply type as shown in FIG. 1 will be described. In this case, the expression (B) is used, and ammonia is used as the solute. The following values are used as parameters used in the calculation. The pressure of the low-pressure drum 44 is 0.5 MPa.

Flow rate $v_I$ (planned value) of feedwater supplied to low-pressure drum 44: 40 [m³/h]

Target concentration $C_L$ of solute in feedwater in low-pressure drum 44: 4.8 [mg/L]

Capacity coefficient $K_L A$: 200 or 800 [m³/h]

Gas-liquid partition coefficient $\kappa = 9.0$ (value calculated assuming that pressure of low-pressure drum is 0.5 MPa)

The solute target concentration $C_L$ is a target concentration when pH of the feedwater in the low-pressure drum 44 is 9.8.

Under the calculation conditions described above, the planned value $C_I$ of the solute concentration is calculated using the expression (B). The planned value $C_{IP,200}$ of the solute concentration when the capacity coefficient $K_L A$ is 200 is $C_{IP,200} = 15.4$ [mg/L] (equivalent to pH=10.1). The planned value $C_{IP,800}$ of the solute concentration when the capacity coefficient $K_L A$ is 800 is $C_{IP,800} = 29.8$ [mg/L] (equivalent to pH=10.2).

Next, the procedure for deciding the planned value $C_I$ of the feedwater concentration for the steam turbine plant 1 of low-pressure water supply type as shown in FIG. 2 will be described. In this case, the expression (A) is used, and ammonia is used as the solute. The following values are used as parameters used in the calculation. The pressure of the low-pressure drum 44 is 0.5 MPa.

Flow rate $v_I$ (planned value) of feedwater supplied to low-pressure drum 44: 350 [m³/h]

Flow rate $v_O$ (planned value) of feedwater discharged from low-pressure drum 44: 310 [m³/h]

Target concentration $C_L$ of solute in feedwater in low-pressure drum 44: 4.8 [mg/L]

Capacity coefficient $K_L A$: 200 or 800 [m³/h]

Gas-liquid partition coefficient $\kappa = 9.0$ (value calculated assuming that pressure of low-pressure drum is 0.5 MPa)

The solute target concentration $C_L$ is a target concentration when pH of the feedwater in the low-pressure drum 44 is 9.8.

Under the calculation conditions described above, the planned value $C_I$ of the solute concentration is calculated using the expression (A). The planned value $C_{IP,200}$ of the solute concentration when the capacity coefficient $K_L A$ is 200 is $C_{IC,200} = 6.01$ [mg/L] (equivalent to pH=9.85). The planned value $C_{IC,800}$ of the solute concentration when the capacity coefficient $K_L A$ is 800 is $C_{IC,800} = 7.66$ [mg/L] (equivalent to pH=9.91).

In the method for deciding the planned value $C_I$ of the solute concentration according to the above-described embodiments, by using the capacity coefficient $K_LA$ of the solute (e.g., ammonia) in the low-pressure drum unit 40, the relationship between the solute concentration of the feedwater to be supplied to the low-pressure drum 44 and the solute concentration in the feedwater in the low-pressure drum 44 can be accurately expressed by the expression (A) or (B), for example, in consideration of the rate of the solute movement from the feedwater (liquid phase) to steam (gas phase) in the low-pressure drum unit 40. Thus, with the method for deciding the planned value $C_I$ of the solute concentration according to the embodiments, the planned value $C_I$ of the concentration of the solute in the feedwater to be supplied to the low-pressure drum 44, which can achieve the target concentration of the solute in the feedwater in the low-pressure drum 44, can be appropriately decided using the capacity coefficient $K_LA$. Therefore, by adjusting the solute concentration of the feedwater to be supplied to the low-pressure drum 44 on the basis of the planned value $C_I$ thus decided, the solute concentration of the feedwater in the low-pressure drum 44 can be appropriately maintained within a target range, and problems (e.g., corrosion of equipment in contact with the feedwater) that may occur due to excessive or insufficient solute concentration of the feedwater in the low-pressure drum 44 can be effectively suppressed.

Further, the gas-liquid partition coefficient κ of the solute (e.g., ammonia) changes depending on the pressure. Thus, by using the gas-liquid partition coefficient κ in addition to the capacity coefficient $K_LA$ for deciding the planned value $C_I$ of the concentration of the solute, the planned value $C_I$ of the concentration of the solute in the feedwater to be supplied to the low-pressure drum 44, which can achieve the target concentration of the solute in the feedwater in the low-pressure drum 44, can be appropriately decided.

In the low-pressure condition, the solute tends to be distributed to the gas phase more easily than in the high-pressure condition, and the solute concentration in the solution tends to decrease. Therefore, if the planned value $C_I$ of the solute concentration is set to keep the solute concentration in the feedwater in the low-pressure drum 44, which has the lowest internal pressure among the plurality of steam drums, within the target range (equal to or higher than specified value), by adjusting the solute supply amount on the basis of the planned value $C_I$, the solute concentration in the feedwater in equipment (intermediate-pressure drum 34, high-pressure drum 24, etc.) with higher internal pressure than the low-pressure drum 44 can be easily kept equal to or higher than the specified value. Thus, it is possible to effectively inhibit corrosion not only in the low-pressure drum 44 but also in the other equipment such as the intermediate-pressure drum 34 and the high-pressure drum 24.

(Water Quality Management Method)

Figure 6:
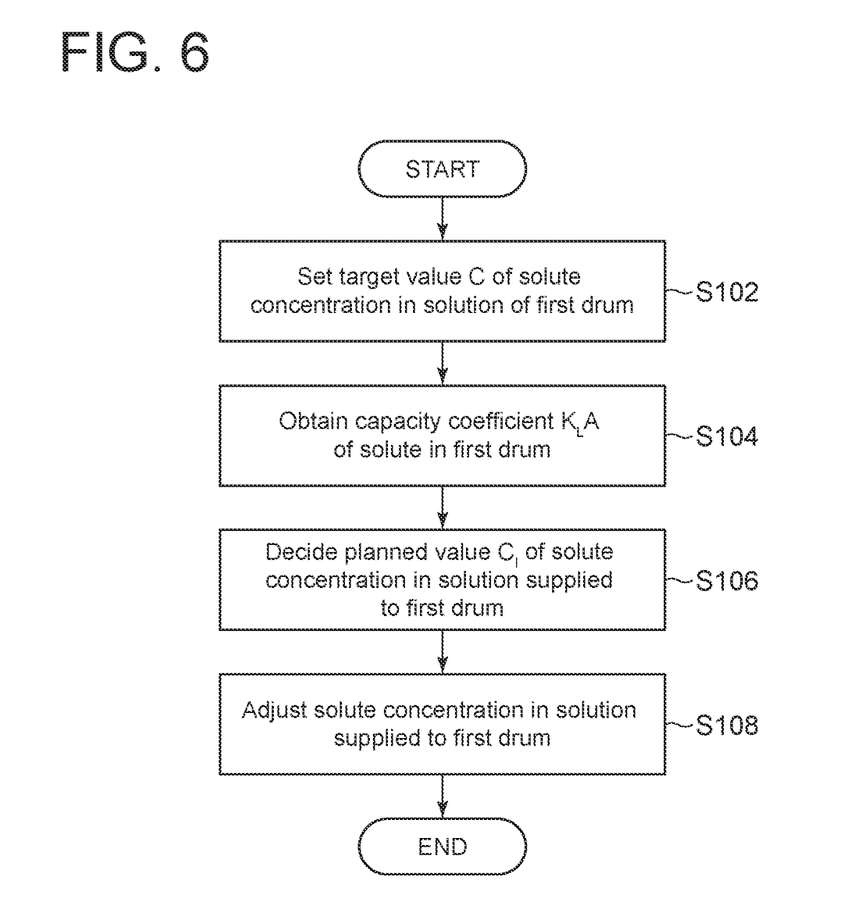
FIG. 6 is a flowchart showing the overview of the water quality management method for a steam turbine plant according to an embodiment.

Next, the water quality management method according to some embodiments will be described. FIG. 6 is a flowchart showing the overview of the water quality management method for a steam turbine plant according to an embodiment. Here, as an example of the water quality management method, we will explain a method for managing the water quality in the steam turbine plant 1 shown in FIG. 1 or 2, using ammonia (solute) as the pH adjuster, so that the pH value in the feedwater (solution) retained in the low-pressure drum 44 as the first drum is within a specified range.

First, the target concentration $C_L$ of ammonia (solute) in the feedwater (solution) in the low-pressure drum 44 (first drum) is set (step S102). For example, if pH of the feedwater in the low-pressure drum 44 is required to be 9.8 or higher in order to inhibit corrosion of the low-pressure drum 44, under the temperature and pressure conditions of the low-pressure drum 44 (here, the pressure of the low-pressure drum is 0.5 MPa), the ammonia concentration corresponding to pH=9.8 is 4.8 [mg/L]. Therefore, the target concentration $C_L$ is set to 4.8 [mg/L].

Next, on the basis of the specification of the steam turbine plant 1, the capacity coefficient $K_LA$ of the low-pressure drum unit 40 is obtained (step S104). Here, the specification of the steam turbine plant includes, for example, the type of boiler (heat recovery steam generator, furnace fuel combustion type, etc.) and the output power of the steam turbine plant. This is because the capacity coefficient $K_LA$ depends on the specification of the steam turbine plant, and when the steam turbine plant has the same specification, the capacity coefficient $K_LA$ is approximately the same.

As already described, in the case of the low-pressure drum unit of the heat recovery steam generator, the capacity coefficient $K_LA$ [m³/h] of ammonia is in a range of about 200 to 800. Therefore, in the case of the steam turbine plant 1 shown in FIGS. 1 and 2, the capacity coefficient $K_LA$ [m³/h] of ammonia in the low-pressure drum unit of 200 to 800 is obtained.

Next, the planned value $C_I$ of the concentration of ammonia in the feedwater to be supplied to the low-pressure drum 44 is decided on the basis of the target concentration $C_L$ obtained in step S102 and the capacity coefficient $K_LA$ obtained in step S104 (step S106).

In the case of the steam turbine plant 1 of parallel water supply type shown in FIG. 1, the concentration planned value $C_I$ can be calculated using the target concentration $C_L$, the capacity coefficient $K_LA$, the flow rate $v_I$ of feedwater supplied to the low-pressure drum 44, and the gas-liquid partition coefficient x, on the basis of the expression (B). As already described, in the calculation of the planned value $C_I$ of the ammonia concentration using the expression (B), when the capacity coefficient $K_LA$ is 200, $C_{IP,200}$=15.4 [mg/L] (equivalent to pH=10.1), and when the capacity coefficient $K_LA$ is 800, $C_{IP,800}$=29.8 [mg/L] (equivalent to pH=10.2). Since pH of the feedwater in the low-pressure drum 44 is required to be kept at 9.8 or higher, among the two ammonia concentration planned values $C_{IP,200}$ and $C_{IP,800}$ obtained as described above, the $C_{IP,800}$=29.8 [mg/L], which is safer, is decided as the planned value $C_I$ of the ammonia concentration.

In the case of the steam turbine plant 1 of low-pressure water supply type shown in FIG. 2, the concentration planned value $C_I$ can be calculated using the target concentration $C_L$, the capacity coefficient $K_LA$, the flow rate $v_I$ of feedwater supplied to the low-pressure drum 44, the flow rate $v_O$ of feedwater discharged from the low-pressure drum 44, and the gas-liquid partition coefficient x, on the basis of the expression (A). As already described, in the calculation of the planned value $C_I$ of the ammonia concentration using the expression (A), when the capacity coefficient $K_LA$ is 200, $C_{IC,200}$=6.01 [mg/L] (equivalent to pH=9.85), and when the capacity coefficient $K_LA$ is 800, $C_{IC,800}$=7.66 [mg/L] (equivalent to pH=9.91). Since it is desirable that pH of the feedwater in the low-pressure drum 44 is kept at 9.8 or higher, among the two ammonia concentration planned values $C_{IC,200}$ and $C_{IC,800}$ obtained as described above, the $C_{IC,800}$=7.66 [mg/L], which is safer, is decided as the planned value $C_I$ of the ammonia concentration.

Then, the concentration of ammonia in the feedwater supplied from the feedwater line 3 to the low-pressure drum 44 is adjusted on the basis of the planned value $C_I$ of the ammonia concentration in the feedwater decided in step S106 (step S108). In other words, the amount of ammonia supplied to the feedwater in the feedwater line 3 by the agent supply part 50 is adjusted so that the ammonia concentration in the feedwater in the feedwater line 3 supplied to the low-pressure drum 44 has the planned value $C_I$. The supply amount of ammonia may be adjusted by the control device 60.

According to the water quality management method according to the above-described embodiment, since the concentration of ammonia (solute) to be supplied to the low-pressure drum 44 is adjusted on the basis of the planned value $C_I$ of the solute concentration decided on the basis of the capacity coefficient $K_L A$, the ammonia concentration in the low-pressure drum 44 can be appropriately maintained within a target range. As a result, it is possible to suppress problems (e.g., corrosion of equipment due to low pH of feedwater) that may occur due to excessive or insufficient ammonia concentration in the low-pressure drum 44.

The contents described in the above embodiments would be understood as follows, for instance.

(1) A solute concentration decision method according to at least one embodiment of the present invention is a method for deciding a planned value $C_I$ of a concentration of a solute (e.g., ammonia) in a solution (e.g., feedwater) to be supplied to a first drum (e.g., low-pressure drum) among one or more steam drums (high-pressure drum 24, intermediate-pressure drum 34, and low-pressure drum 44) for temporarily containing steam generated in a boiler (e.g., heat recovery steam generator 2) of a steam turbine plant (1), including a step of deciding the planned value $C_I$ of the concentration of the solute in the solution to be supplied to the first drum, on the basis of a target concentration $C_L$ of the solute in the solution in the first drum and a capacity coefficient $K_L A$ of the solute in a drum unit (e.g., low-pressure drum unit 40) including the first drum and an evaporator (e.g., low-pressure evaporator 46) for generating steam contained in the first drum.

As described above, a gas-liquid partition coefficient of a solute calculated on the basis of actual measurements in the steam turbine plant may deviate significantly from a literature value of the gas-liquid partition coefficient of the solute. The reason may be that the gas-liquid partition coefficient in the literature assumes gas-liquid equilibrium, whereas in the actual steam turbine plant, the time that the solution (feedwater) and steam remain in the drum is short, and complete gas-liquid equilibrium is not achieved.

In this regard, in the above method (1), by using the capacity coefficient of the solute in the drum unit (hereinafter referred to simply as the capacity coefficient), the relationship between the concentration of the solution to be supplied to the first drum and the solute concentration in the solution in the first drum can be accurately expressed, in consideration of the rate of the solute movement from the liquid phase (solution) to the gas phase in the drum unit. Thus, according to the above method (1), the planned value $C_I$ of the concentration of the solute in the solution to be supplied to the first drum, which can achieve the target concentration of the solute in the solution in the first drum, can be appropriately decided using the capacity coefficient. Therefore, by adjusting the solute concentration of the solution to be supplied to the first drum on the basis of the planned value $C_I$ thus decided, the solute concentration of the solution in the first drum can be appropriately maintained within a target range, and problems (e.g., corrosion of equipment in contact with the solution) that may occur due to excessive or insufficient solute concentration of the solution in the first drum can be suppressed.

(2) In some embodiments, the above method (1) includes deciding the planned value $C_I$ of the concentration of the solute on the basis of a gas-liquid partition coefficient κ of the solute in the first drum in addition to the target concentration $C_L$ and the capacity coefficient $K_L A$.

According to the above method (2), by using the gas-liquid partition coefficient κ of the solute, which changes depending on the pressure, in addition to the capacity coefficient $K_L A$, the relationship between the solute concentration of the solution to be supplied to the first drum and the solute concentration in the solution in the first drum can be accurately expressed. Thus, according to the above method (2), the planned value $C_I$ of the concentration of the solute in the solution to be supplied to the first drum, which can achieve the target concentration $C_L$ of the solute in the solution in the first drum, can be appropriately decided using the gas-liquid partition coefficient κ in addition to the capacity coefficient $K_L A$.

(3) In some embodiments, the above method (1) or (2) includes: determining an actual gas-liquid partition coefficient $\kappa_R$ during mass transfer which is a ratio of a concentration $C_S$ of the solute in the steam in the first drum to a target concentration $C_L$ of the solute in the solution in the first drum on the basis of the following expression (C); and deciding the planned value $C_I$ of the concentration of the solute on the basis of the actual gas-liquid partition coefficient $\kappa_R$. In the following expression (C), $K_L A$ is the capacity coefficient of the solute in the drum unit, κ is the gas-liquid partition coefficient of the solute in the first drum, and $v_S$ is a flow rate of condensed water of a gas flowing out of the first drum.

$$\kappa_R = \frac{C_S}{C_L} = \left( \frac{1}{1 + \frac{\kappa v_S}{K_L A}} \right) \kappa \tag{C}$$

Thus, according to the above method (3), the planned value $C_I$ of the concentration of the solute in the solution to be supplied to the first drum, which can achieve the target concentration of the solute in the solution in the first drum, can be appropriately decided on the basis of the actual gas-liquid partition coefficient $\kappa_R$ which indicates the actual gas-liquid partition ratio when the solute moves from the solution (feedwater, etc.) to steam in the steam drum of the steam turbine plant.

(4) In some embodiments, any one of the above methods (1) to (3) includes deciding the planned value $C_I$ of the concentration of the solute on the basis of the following expression (A). In the following expression (A), $C_L$ is the target concentration of the solute in the solution in the first drum (e.g., low-pressure drum 44), $K_L A$ is the capacity coefficient of the solute in the drum unit (e.g., low-pressure drum unit 40), κ is the gas-liquid partition coefficient of the solute in the first drum, $v_I$ is a flow rate of the solution supplied to the first drum, $v_O$ is a flow rate of the solution discharged from the first drum and to be supplied to one or more steam drums (e.g., intermediate-pressure drum 34 and high-pressure drum 24) that have a higher internal pressure than the first drum among the one or more steam drums.

$$C_I = \frac{K_L A \cdot \kappa (v_I - v_O) + K_L A \cdot v_O + \kappa(v_I - v_O) \cdot v_O}{\kappa v_I (v_I - v_O) + K_L A \cdot v_I} C_L \tag{A}$$

The expression (A) expresses the relationship between the concentration ($C_I$) of the solution to be supplied to the first drum and the concentration ($C_L$) of the solute in the solution in the first drum using the capacity coefficient $K_L A$, on the basis of the mass balance in the first drum when the flow rate of the solution discharged from the first drum and supplied to the steam drum with higher internal pressure is $v_O$. Thus, according to the above method (4), the planned value $C_I$ of the concentration of the solute in the solution to be supplied to the first drum, which can achieve the target concentration of the solute in the solution in the first drum, can be appropriately decided on the basis of the expression (A).

(5) In some embodiments, any one of the above methods (1) to (4) includes deciding the planned value $C_I$ of the concentration of the solute on the basis of the following expression (B). In the following expression (B), $C_L$ is the target concentration of the solute in the solution in the first drum (e.g., low-pressure drum 44), $K_L A$ is the capacity coefficient of the solute in the drum unit (e.g., low-pressure drum unit 40), κ is the gas-liquid partition coefficient of the solute in the first drum, and $v_I$ is a flow rate of the solution supplied to the first drum.

$$C_I = \frac{\kappa \cdot K_L A}{\kappa v_I + K_L A} C_L \quad \text{(B)}$$

The expression (B) expresses the relationship between the concentration ($C_I$) of the solution to be supplied to the first drum and the concentration ($C_L$) of the solute in the solution in the first drum using the capacity coefficient $K_L A$, on the basis of the mass balance in the first drum when the solution in the first drum is not supplied to another steam drum. Thus, according to the above method (5), the planned value $C_I$ of the concentration of the solute in the solution to be supplied to the first drum, which can achieve the target concentration of the solute in the solution in the first drum, can be appropriately decided on the basis of the expression (B).

(6) In some embodiments, in any one of the above methods (1) to (5), the solute (e.g., ammonia) is a pH adjuster. The target concentration of the solute is set so that pH of the solution in the first drum is within a target range.

In the steam turbine plant, the susceptibility of equipment (e.g., first drum) in contact with the solution (e.g., feedwater) to corrosion changes depending on pH of the solution. In this regard, according to the above method (6), since the target concentration of the pH adjuster (solute) in the solution in the first drum is set so that pH of the solution in the first drum is within the target range, by adjusting the solute concentration to be supplied to the first drum on the basis of the planned value $C_I$ decided on the basis of the target concentration, pH of the solution in the first drum can be appropriately maintained within the target range. Therefore, by setting the target range of pH appropriately, it is possible to effectively suppress corrosion of the first drum caused by contact with the solution.

(7) In some embodiments, in any one of the above methods (1) to (6), the first drum is a steam drum (low-pressure drum 44) having the lowest internal pressure among the one or more steam drums.

In the low-pressure condition, the solute tends to be distributed to the gas phase more easily than in the high-pressure condition, and the solute concentration in the solution tends to decrease. In this regard, according to the above method (7), since the solute concentration in the solution in the steam drum (low-pressure drum 44) with the lowest internal pressure among the one or more drums can be easily kept within a target range (equal to or higher than specified value), the solute concentration in the solution in equipment (intermediate-pressure drum 34, high-pressure drum 24, etc.) with higher internal pressure than the low-pressure drum can also be kept equal to or higher than the specified value. Thus, it is possible to effectively inhibit corrosion not only in the low-pressure drum 44 but also in such equipment (intermediate-pressure drum 34, the high-pressure drum 24, etc.).

(8) In some embodiments, in any one of the above methods (1) to (7), a capacity coefficient obtained based on actually measured data of the steam turbine plant (1) or another steam turbine plant is used as the capacity coefficient $K_L A$.

According to the inventors' knowledge, the capacity coefficients $K_L A$ of drum units with the same internal pressure in a steam turbine plant with the same output power are in the same range. Thus, according to the above method (8), the planned value $C_I$ of the concentration of the solute in the solution to be supplied to the first drum, which can achieve the target concentration of the solute in the solution in the first drum, can be appropriately decided using the capacity coefficient $K_L A$ previously obtained based on the actually measured data of the steam turbine plant having the same output power.

(9) A solute concentration decision method according to at least one embodiment of the present invention is a method for deciding a planned value $C_I$ of a concentration of a solute (e.g., ammonia) in a solution (e.g., feedwater) to be supplied to a first drum (e.g., low-pressure drum) among one or more steam drums (high-pressure drum 24, intermediate-pressure drum 34, and low-pressure drum 44) for temporarily containing steam generated in a boiler (e.g., heat recovery steam generator 2) of a steam turbine plant (1), including: a step of setting a target concentration $C_L$ of the solute in the solution of the first drum; a step of obtaining a capacity coefficient ($K_L A$) of a drum unit (e.g., low-pressure drum unit 40) including the first drum and an evaporator (e.g., low-pressure evaporator 46) for generating steam contained in the first drum, on the basis of a specification of the steam turbine plant; and a step of deciding the planned value $C_I$ of the concentration of the solute in the solution to be supplied to the first drum, on the basis of the target concentration ($C_L$) and the capacity coefficient ($K_L A$).

By using the capacity coefficient of the solute in the drum unit, the relationship between the solute concentration of the solution to be supplied to the first drum and the solute concentration in the solution in the first drum can be accurately expressed, in consideration of the rate of the solute movement from the liquid phase (solution) to the gas phase in the drum unit. Thus, according to the above method (9), the planned value $C_I$ of the concentration of the solute in the solution to be supplied to the first drum, which can achieve the target concentration of the solute in the solution in the first drum, can be appropriately decided using the capacity coefficient $K_L A$. Therefore, by adjusting the solute concentration of the solution to be supplied to the first drum on the basis of the planned value $C_I$ thus decided, the solute concentration in the first drum can be appropriately maintained within a target range, and problems (e.g., corrosion of equipment in contact with the solution) that may occur due to excessive or insufficient solute concentration of the solution in the first drum can be suppressed.

(10) A water quality management method for a steam turbine plant according to at least one embodiment of the present invention includes a step of adjusting a concentration of a solute in a solution to be supplied to the first drum, on the basis of the planned value $C_I$ of the concentration of the solute decided in accordance with the solute concentration decision method described in any one of the above methods (1) to (9).

According to the above method (10), since the solute concentration of the solution to be supplied to the first drum is adjusted on the basis of the planned value $C_I$ of the solute concentration decided on the basis of the capacity coefficient $K_L A$ in accordance with any one of the above methods (1) to (9), the solute concentration of the solution in the first drum can be appropriately maintained within a target range. As a result, it is possible to suppress problems (e.g., corrosion of equipment in contact with the solution) that may occur due to excessive or insufficient solute concentration of the solution in the first drum.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have" are not intended to be exclusive of other components.

REFERENCE SIGNS LIST

1 Steam turbine plant
2 Heat recovery steam generator
3 Feedwater line
3a Low-pressure branch line
3b Intermediate-pressure branch line
3c High-pressure branch line
4 Feedwater pump
6 High and intermediate pressure feedwater pump
8 Steam turbine
10 Reheater
12 Condenser
20 High-pressure drum unit
22 High-pressure economizer
24 High-pressure drum
26 High-pressure evaporator
27 Evaporator tube
28 High-pressure superheater
30 Intermediate-pressure drum unit
32 Intermediate-pressure economizer
33 High and intermediate pressure feedwater line
33b Intermediate-pressure branch line
33c High-pressure branch line
34 Intermediate-pressure drum
36 Intermediate-pressure evaporator
37 Evaporator tube
38 Intermediate-pressure superheater
40 Low-pressure drum unit
42 Low-pressure economizer
44 Low-pressure drum
46 Low-pressure evaporator
47 Evaporator tube
48 Low-pressure superheater
50 Agent supply part
52 Agent tank
53 Agent line
54 Agent pump
56 Concentration sensor
60 Control device
101 Liquid body
102 Liquid boundary film
103 Gas boundary film
104 Gas body
204 Virtual liquid phase

The invention claimed is:

1. A solute concentration decision method for deciding a planned value $C_I$ of a concentration of a solute in a solution to be supplied to a first drum among one or more steam drums for temporarily containing steam generated in a boiler of a steam turbine plant, the method comprising
a step of deciding the planned value $C_I$ of the concentration of the solute in the solution to be supplied to the first drum, on the basis of a target concentration of the solute in the solution in the first drum and a capacity coefficient of the solute in a drum unit including the first drum and an evaporator for generating steam contained in the first drum.

2. The solute concentration decision method according to claim 1, comprising:
deciding the planned value $C_I$ of the concentration of the solute on the basis of a gas-liquid partition coefficient of the solute in the first drum in addition to the target concentration and the capacity coefficient.

3. The solute concentration decision method according to claim 1, comprising:
determining an actual gas-liquid partition coefficient KR during mass transfer which is a ratio of a concentration Cs of the solute in the steam in the first drum to a target concentration $C_L$ of the solute in the solution in the first drum on the basis of the following expression (C); and
deciding the planned value $C_I$ of the concentration of the solute on the basis of the actual gas-liquid partition coefficient $\kappa_R$,
where, in the following expression (C), $K_L A$ is the capacity coefficient of the solute in the drum unit, $\kappa$ is the gas-liquid partition coefficient of the solute in the first drum, and $V_S$ is a flow rate of condensed water of a gas flowing out of the first drum:

$$\kappa_R = \frac{Cs}{C_L} = \left( \frac{1}{1 + \frac{\kappa V_S}{K_L A}} \right) \kappa \quad \text{(C)}$$

4. The solute concentration decision method according to claim 1, comprising:
deciding the planned value $C_I$ of the concentration of the solute on the basis of the following expression (A),
where, in the following expression (A), $C_L$ is the target concentration of the solute in the solution in the first drum, $K_LA$ is the capacity coefficient of the solute in the drum unit, κ is the gas-liquid partition coefficient of the solute in the first drum, $V_I$ is a flow rate of the solution supplied to the first drum, $V_O$ is a flow rate of the solution discharged from the first drum and to be supplied to one or more steam drums that have a higher internal pressure than the first drum among the one or more steam drums:

$$C_I = \frac{K_LA \cdot \kappa(v_I - v_O) + K_LA \cdot v_O + \kappa(V_I - v_O) \cdot v_O}{\kappa v_I(v_I - v_O) + K_LA \cdot v_I} C_L \quad (A)$$

5. The solute concentration decision method according to claim 1, comprising:

deciding the planned value $C_I$ of the concentration of the solute on the basis of the following expression (B), where, in the following expression (B), $C_L$ is the target concentration of the solute in the solution in the first drum, $K_LA$ is the capacity coefficient of the solute in the drum unit, κ is the gas-liquid partition coefficient of the solute in the first drum, and $V_I$ is a flow rate of the solution supplied to the first drum:

$$C_I = \frac{\kappa \cdot K_LA}{\kappa v_I + K_LA} C_L. \quad (B)$$

6. The solute concentration decision method according to claim 1, wherein the solute is a pH adjuster, and wherein the target concentration of the solute is set so that pH of the solution in the first drum is within a target range.

7. The solute concentration decision method according to claim 1, wherein the first drum is a steam drum having the lowest internal pressure among the one or more steam drums.

8. The solute concentration decision method according to claim 1, wherein a capacity coefficient obtained based on actually measured data of the steam turbine plant or another steam turbine plant is used as the capacity coefficient.

9. A solute concentration decision method for deciding a planned value $C_I$ of a concentration of a solute in a solution to be supplied to a first drum among one or more steam drums for temporarily containing steam generated in a boiler of a steam turbine plant, the method comprising:

a step of setting a target concentration of the solute in the solution of the first drum;

a step of obtaining a capacity coefficient of a drum unit including the first drum and an evaporator for generating steam contained in the first drum, on the basis of a specification of the steam turbine plant; and a step of deciding the planned value $C_I$ of the concentration of the solute in the solution to be supplied to the first drum, on the basis of the target concentration and the capacity coefficient.

10. A water quality management method for a steam turbine plant, comprising:

a step of adjusting a concentration of a solute in a solution to be supplied to the first drum, on the basis of the planned value $C_I$ of the concentration of the solute decided in accordance with the solute concentration decision method according to claim 1.

\* \* \* \* \*